June 19, 1962 — A. L. ANDERSON — 3,039,660
SEEDER
Filed April 13, 1959
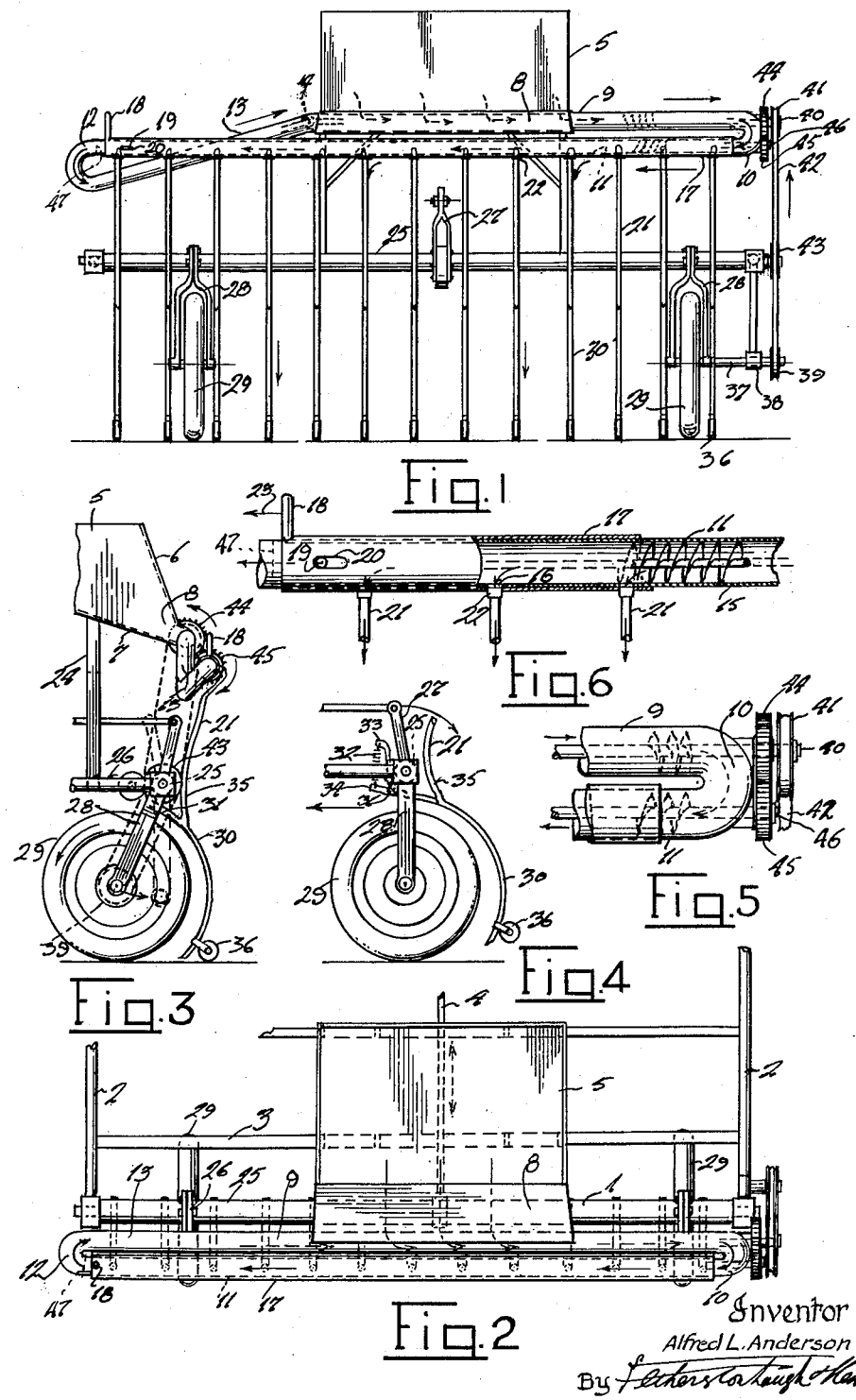
Inventor
Alfred L. Anderson
By Fetherstonhaugh & Hart
PATENT ATTORNEYS

United States Patent Office 3,039,660
Patented June 19, 1962

3,039,660
SEEDER
Alfred L. Anderson, 437 21st Ave. NW.,
Calgary, Alberta, Canada
Filed Apr. 13, 1959, Ser. No. 805,908
3 Claims. (Cl. 222—238)

My invention relates to new and useful improvements in seeders, particularly seeders adapted to be drawn by a tractor or the like.

Conventional seeders consist of a transverse hopper apertured at the base thereof to communicate with a plurality of seed tubes and these suffer from the principal disadvantage that it is difficult to maintain an even supply of seed at each seed tube. This is particularly noticeable when working on sloping ground wherein the tubes at the higher side of the machine often become starved.

Furthermore, the seed tubes are fixed with relation to the framework so that they often become damaged by engaging stones, roots and the like.

I have overcome these disadvantages by providing a seeder which includes a hopper feeding an auger, which in turn feeds a main feed auger having a return to the hopper so that a continuous supply of seed is available at the feed auger, any surplus being returned to the hopper. Furthermore, by pivoting feed spouts, and providing a small ground engaging wheel adjacent the lower end of each feed spout, same may be pushed clear of any obstruction by the obstruction itself. In this connection, I provide a small spring for each feed spout to maintain the wheel in contact with the ground.

The principal object and essence of my invention is, therefore, to provide a seeder which is extremely simple in construction, and which may be attached to conventional farm equipment.

Another object of my invention is to provide a device of the character herewithin described which includes means whereby the feed spout may be raised clear of the ground when the seeder is not in use.

A yet further object of my invention is to provide a device of the character herewithin described which provides a continuous flow of seed through the seed tubes, any surplus being returned to the hopper in a continuous system.

Still another object of my invention is to provide a device of the character herewithin described in which the flow of seed from the feed auger to the tubes may be regulated and, if required, completely closed off.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a rear elevation of my device.

FIGURE 2 is a top plan view thereof.

FIGURE 3 is a partial side elevation of the device showing, in particular, the mounting of one of the wheels, the seed tube being in the ground engaging position.

FIGURE 4 is a partial view similar to FIGURE 3 but showing the seed tube in the raised position.

FIGURE 5 is an enlarged fragmentary view of the right hand upper corner of FIGURE 1.

FIGURE 6 is an enlarged fragmentary and partially sectioned view of part of the feed auger, and sliding tube component, shown in plan.

In the drawings like characters of reference indicate corresponding parts in the different figures.

Proceeding, therefore, to describe my invention in detail, reference should be made to the accompanying drawings in which I have illustrated a main transverse rear frame member 1 with a pair of spaced and parallel longitudinal supporting members 2 extending therefrom, being braced by transverse members 3. A further longitudinal member 4 extends from the rear frame member 1 forwardly to a tongue (not illustrated) by which the device may be towed by a conventional tractor or the like.

A grain hopper 5 is mounted upon the transverse member 3 substantially centrally thereof, the rear side 6 and the base 7 converging together to the rear corner 8, so that grain normally will gravitate towards this rear corner.

An auger and tube 9 extend clear through this rear corner and continue to the right hand end (reference FIGURE 1) of the machine to terminate in a semicircular conduit 10. This conduit 10 communicates with a main feed auger 11 situated parallel with the rear frame member and being supported thereby. This main feed auger 11 extends transversely across the rear of the machine and communicates at the left hand end thereof (reference to FIGURE 1) with a further curved conduit 12.

This curved conduit 12 in turn, communicates with an inclined auger 13, which in turn, extends to the corner 8 of the hopper 5 and connects with the aforementioned auger 9 by means of universal joint 14. From the foregoing, it will be appreciated that a closed auger system is provided, thus ensuring adequate seed for the seeder, any surplus being returned to the hopper by the closed cycle.

The tube 15 and the main feed auger 11 comprise a screw conveyer and the tube 15 is apertured on the side thereof as at 16 and a sleeve 17 surrounds the tube and is slidable lengthwise thereon by means of handle 18.

The amount of lengthwise movement of the sleeve 17 upon the tube 11 is governed by a pin 19 secured to and extending from the tube 11, said pin entering an elongated slot 20 within the wall of the sleeve 17 as clearly shown in FIGURE 6.

A plurality of flexible seed feeding tubes 21 are connected by means of funnels 22 through the wall of the sleeve 17 and are positioned so that when the sleeve is in the position shown in FIGURE 6, the aforementioned apertures 16 are in alignment with the funnels 22 so that seed can pass from the auger 11 through the flexible feed tubes 21. However, when the sleeve 17 is moved in the direction of arrow 23 by means of the handle 18, the apertures 16 become misaligned with the funnels 22 so that when the sleeve is at the opposite end of its travel, the apertures are completely sealed off from the funnels. Any position in between the limits imposed by the pin 19 within slot 20 controls the amount of grain passing into the flexible seed tubes 21.

Vertically situated posts 24 depend from the framework and support a wheel frame member 25 by means of horizontal bracing 26. This wheel frame member is rotatable within limits, within the ends of the horizontal member 26, said rotation being controlled through lever 27 which may be connected to the tractor.

A pair of wheel forks 28 are secured to the wheel frame member 25 and depends downwardly therefrom, said forks carrying ground engaging wheels 29 journalled for rotation therewithin. Also supported upon the wheel frame member 25 is a plurality of arcuately curved seed spouts 30, said spouts being pivoted as at 31 within limits, but being maintained in the lowermost position by a tension spring 32 which extends between arm 33 and extension 34 of the seed spout, and it will be observed that the lower ends 35 of the flexible seed tubes 21 connect to each of these seed spouts 30.

It will also be observed that each seed spout 30 is provided with a ground engaging wheel 36 adjacent the lower end thereof to prevent same from digging into the soil during operation.

The axle 37 carrying the right hand wheel 29 (with reference to FIGURE 1) extends to one side of the device, being supported within hanger bearing 38 and is provided with a V-pulley 39 upon the end thereof, the extending end 40 of the auger shaft of auger 9 also carries a V-pulley 41 and a V-belt 42 extends around pulleys 39 and 41, passing over a further pulley 43 mounted freely upon the end of the wheel supporting member 25. Gears 44 and 45 are secured to auger shaft 40 and the auger shaft 46 of the main feed auger 11, thus ensuring that the augers 9 and 11 rotate oppositely.

The engagement of wheels 29 with the ground thus provides the drive, via V-belt 42 for the auger system provided the wheels 29 are in the position shown in FIGURE 3.

However, when they are placed in the position shown in FIGURE 4 by means of the hydraulic control through link 27, this raises the seed tubes 30 clear of the ground and at the same time, slackens the belt 42 which thus ceases to supply drive to the auger system.

Finally it will be noted that a baffle plate 47 is introduced adjacent the junction of sleeve 17 and conduit 12, and within the latter, and up to the level of the outlets of feed tubes 21 in order to back up the seed flow in tube 15.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a seeder, the combination of a horizontally elongated seed hopper including a conduit-shaped bottom portion extending longitudinally of the hopper and having outlet and inlet ends at the respective opposite ends of the hopper, a rotatable auger provided in said conduit-shaped bottom portion of said hopper for moving seed therein toward the outlet end, a screw conveyor disposed in parallel relation to said conduit-shaped bottom portion of the hopper and having inlet and outlet ends adjacent the respective outlet and inlet ends of said conduit-shaped bottom portion, elbow-shaped duct means connecting the outlet end of said conduit-shaped bottom portion to the inlet end of said screw conveyor whereby seed moved by said auger in said conduit-shaped bottom portion may be delivered into the screw conveyor, a plurality of seed discharge tubes provided at longtudinally spaced points on said screw conveyor and extending downwardly therefrom whereby a substantial portion of seed carried by said conveyor may be discharged through said tubes, second elbow-shaped duct means connecting the outlet of said screw conveyor to the inlet end of said conduit-shaped bottom portion of said hopper whereby surplus seed carried by said conveyor and not discharged through said tubes may be returned into the hopper, and means for simultaneously driving said conveyor and said auger.

2. The combination as defined in claim 1 wherein said screw conveyor is disposed in a horizontal plane spaced downwardly from said conduit-shaped bottom portion of said hopper whereby seed moved by said auger may gravitate through the first mentioned duct means to the inlet of said conveyor, said second duct means including an inclined tube communicating at its upper end with the inlet end of said conduit-shaped bottom portion of the hopper, and a rotatable auger provided in said inclined tube and operatively connected to the first mentioned auger.

3. The combination as defined in claim 1 wherein said screw conveyor is provided with a row of longitudinally spaced openings, and a tubular jacket slidably positioned on said screw conveyor, the upper ends of said seed discharge tubes being connected to said jacket and registrable with said openings when the jacket is slid to a predetermined position on said conveyor.

References Cited in the file of this patent

UNITED STATES PATENTS

| | | |
|---|---|---|
| 135,846 | Reams | Feb. 11, 1873 |
| 2,596,898 | Hoppes | May 13, 1952 |
| 2,698,114 | Buhr | Dec. 28, 1954 |
| 2,743,860 | Saxe | May 1, 1956 |